United States Patent [19]

Toyoaki et al.

[11] 4,066,189

[45] Jan. 3, 1978

[54] APPARATUS FOR CONTROLLED INJECTION OF A MOLTEN MATERIAL UNDER PRESSURE

[75] Inventors: Ueno Toyoaki, Yoshiki; Takayama Seizo, Ube; Hashimoto Kiyoshi, Ube; Uchida Masashi, Ube, all of Japan

[73] Assignee: Ube Industries, Ltd., Ube, Japan

[21] Appl. No.: 653,028

[22] Filed: Jan. 28, 1976

[30] Foreign Application Priority Data

| Jan. 31, 1975 | Japan | 50-13045 |
| Jan. 31, 1975 | Japan | 50-13046 |
| Feb. 5, 1975 | Japan | 50-14383 |
| Feb. 5, 1975 | Japan | 50-14384 |
| Mar. 4, 1975 | Japan | 50-25585 |
| Mar. 4, 1975 | Japan | 50-25586 |

[51] Int. Cl.² .......................... B22D 39/00
[52] U.S. Cl. .................. 222/334; 91/27; 164/155; 425/146
[58] Field of Search .............. 91/27; 164/155; 425/145, 146; 222/1, 334, 413, 372, 383

[56] References Cited

U.S. PATENT DOCUMENTS

| 2,526,809 | 10/1950 | Cole | 91/27 |
| 2,921,561 | 1/1960 | Sendoykas | 91/27 X |
| 3,752,363 | 8/1973 | Fegley | 425/145 X |
| 3,857,658 | 12/1974 | Muzsnay | 425/145 |

Primary Examiner—Robert B. Reeves
Assistant Examiner—David A. Scherbel
Attorney, Agent, or Firm—Richard H. Zaitlen

[57] ABSTRACT

A method of injecting a molten material such as molten metal or plasticizing resin under pressure and an apparatus performing the same wherein the piston speed of a cylinder for injecting the molten material is made to decrease before the mold cavity is filled up to the full with the molten material, thereby peak pressure generated in the molten material filled up to the full being eliminated and further pressure vibration occurred in a pressurized oil being obviated.

18 Claims, 26 Drawing Figures

APPARATUS FOR CONTROLLED INJECTION OF A MOLTEN MATERIAL UNDER PRESSURE

BACKGROUND OF THE INVENTION

This invention relates to a method of injecting a molten material such as molten metal or plasticizing resin into a mold under pressure, and also relates to an injection apparatus used in an injection molding system such as a die casting machine, a plastic molding machine and so forth, and capable of utilizing the method of this invention.

In a prior art die casting machine, the speed of injecting the molten material, i.e. the piston speed of the cylinder for injecting the molten material has been set as about 2 to 3 cm/sec thus far, and a typical program of injection has been designed as that shown in FIG. 1, where the ordinate represents the speed of the piston while the abscissa representing time. Explaining a typical example of the casting program in the prior art die casting machine in accordance with the figure above, it will be understood that the piston is initially moved at a slow speed from the beginning up to the time $t_1$, and then it changes its motion to the high speed one when the time has become $t_1$. At the same time, casting of molten material is commenced at this time $t_1$, and then casting process is finished at the time $t_2$. As seen in the casting program set forth above, the increase of the piston speed occurs very abruptly at the beginning of the high speed injection and the decrease equally the piston speed at the time when the filling of molten material has been completed. It has been generally said that the higher speed die casting can provide a product with better physical property. However, in the event that the casting process follows such a program set forth above that has a steep pattern at both rising up and falling down portion of piston speed, there have been problems set forth below.

1. From the beginning of filling up the mold with molten material to the end thereof, the piston is kept operated with high speed, where the piston pressure is about 140–240 kg/cm$^2$, so that the kinetic energy of the piston is transmitted directly to the molten material, thus producing peak pressure in the molten material filling up the mold cavity, generating casting fins and, in the worst case, ejecting the molten material from the interface of two halves of the metal mold.

2. Even when the injection has been completed, the pressurized oil for pushing the piston has still a large kinetic energy. Thus, this kinetic energy is transmitted abruptly to the piston which is about to stop its motion completely, so that peak pressure in the molten material ought to be enhanced further, Then, as shown in FIG. 2, pressure vibration takes place in the pressurized oil. This vibration is transmitted to the molten material, which is about to solidify in the cavity, thereby the product cast being made porous or less densified in its inside. In FIG. 2, the ordinate represents the piston pressure while the abscissa representing time.

SUMMARY OF THE INVENTION

Accordingly, a main object of this invention is to provide a method of injecting a molten material under pressure into a mold, and further to provide an improved injection apparatus by which the method above is realized, whereby the peak pressure in the molten material filling up the mold due to the kinetic energy of the piston is obviated.

Another object of this invention is to provide a method of injecting a molten material into a mold and an improved injection apparatus performing the same, whereby the kinetic energy of the pressurized oil which is transmitted to the piston abruptly upon completion of filling up the mold with the molten material is decreased to a large extent.

Still another object of this invention is to provide a method of injecting a molten material into a mold and an improved injection apparatus capable of realizing the method above, whereby casting fins caused by the peak pressure set forth above is minimized.

It is still another object to provide a method of injecting a molten material into a mold and an improved injection apparatus capable of performing the method above, whereby the product from such process porousness and/or less density due to the pressure vibration in the pressurized oil being effectively eliminated.

In accordance with this invention, these and further objects can be accomplished by providing an improved method of injecting a molten material under pressure into a metal mold which comprises the step of decreasing the speed of the piston for injecting the molten material into the mold before the mold cavity is completely filled up with said molten material.

Further, the objects can be accomplished by providing an improved injection apparatus for injecting a molten material into the metal mold, wherein said apparatus is provided with a run-around circuit which is formed by disposing a check valve on the path running from the rod side of the injection cylinder to the head side of the same, wherein said apparatus is further provided with a path which is prepared in said run-around circuit and is made to close in response to an advance of the piston rod, and wherein said apparatus is further provided with a means for adjusting the position at which said path is closed in response to an advance of the piston rod.

Still further, the objects can be accomplished by providing an improved injection apparatus wherein there is provided a run-around circuit which is formed by disposing a check valve on the path running from the rod side of the cylinder to the head side of the same, wherein there is further provided a path in said run-around circuit, said path being made to close in response to advance of the piston rod, and wherein there is further provided a means for throttling said path to reduce gradually the quantity of the oil flowing through said path in response to advance of the piston rod.

Still further, the objects can be accomplished by providing an improved injection apparatus wherein there is provided a run-around circuit which is formed by disposing a check valve on the path running from the rod side of the cylinder to the head side of the same, wherein there is further provided a path in said rn-around circuit, said path being made to close in response to advance of the piston rod, wherein there is further provided a valve in the rod side circuit of the cylinder, said valve being made to open when the pressure in the rod side of the cylinder has become higher than that in the head side of the same, and wherein there are further provided a throttle valve for controlling the piston speed and a relief valve for controlling the output of the piston.

Still further, the objects can be accomplished by providing an improved injection apparatus wherein there is provided a cylindrical hollow rod having a blocked tip portion and installed at the head side of the cylinder, said hollow rod being arranged slidably inside the piston and piston rod in the direction of the coaxial line thereof, said hollow rod being provided with a port which is formed at the portion near the tip thereof and is adapted to connect the inside of the rod to the outside of the same, the outer circumferential surface of the rod being made to contact closely with the inner circumferential surface of the piston, the surfaces contacting to each other being able to slide along said coaxial line direction, said hollow rod being further provided with a check valve at the end portion thereof.

Still further, the objects can be accomplished by providing an improved injection apparatus wherein there is provided a cylinder used exclusively for high speed advance besides a cylinder for low speed advance, said high speed cylinder being constructed slowing down its advancing operation when it approaches to the advance limit thereof.

Still further, the objects can be accomplished by providing an improved injection apparatus wherein there is provided a control valve of which the piston is made to slide by means of a differential pressure between the head side of the cylinder and the rod side of the same and which releases the pressure of the rod side of the cylinder when said piston of the valve comes to the position for opening, and wherein there is further provided a throttle valve between the head side of the cylinder and said control valve.

BRIEF DESCRIPTION OF THE DRAWINGS

The invention will be better understood from the following detailed description taken in conjunction with the accompanying drawings in which.

DETAILED DESCRIPTION OF THE PREFERRED EMBODIMENT

Generally, the following ways may be proposed in order to overcome the difficulties set forth above.

1. To decrease the weight of the piston for injecting the molten material into the mold;
2. To reduce the quantity of moving oil used in the oil hydraulic system, and
3. To set an accumulator more closely so as to absorb vibration.

The inventors assume that the peak pressure and the pressure vibration are caused by kinetic energy possessed by the high speed operated piston and the moving pressurized oil in the oil hydraulic circuit, and analyzed the problems as follows. The total kinetic energy E produced by the moving piston and oil is expressed in a well-known formula, $$E = \tfrac{1}{2} m_1 \cdot (v_1)^2 + \tfrac{1}{2} m_2 \cdot (v_2)^2$$

where $m_1$ and $m_2$ are representing the masses of the piston and the oil respectively while $v_1$ and $v_2$ designate the speeds of the moving piston and oil respectively.

Figure 3:
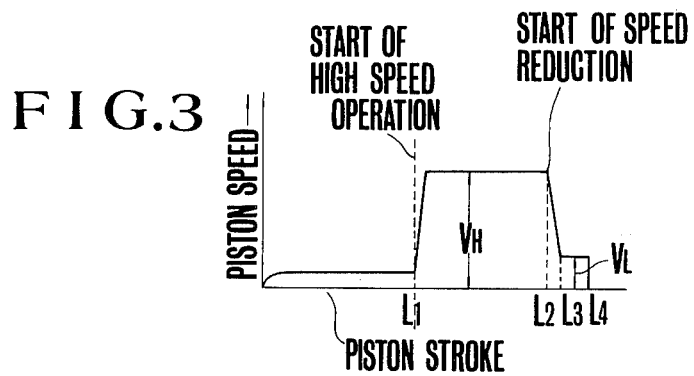
FIG. 3 is a graphical representation to explain a novel program of piston operation in accordance with this invention in terms of the piston speed vs stroke.

The ways (1) and (2) proposed above correspond to decreasing the values of $m_1$ and $m_2$. It is apparent, however, that reducing the values of $v_1$ and $v_2$ is more effective than reducing the values of $m_1$ and $m_2$ for decreasing the total energy E which causes undesirable peak pressure and pressure vibration. In other words, to obviate the undesirable phenomena one could slow down the piston speed before the mold cavity is completely filled up with the molten material. This will be further explained by referring to FIG. 3. In this figure, the ordinate represents the piston speed while the abscissa representing the piston stroke. The piston moves at a low speed until the stroke $L_1$. Then the piston starts moving at a high speed and is moving at the speed $V_H$ during the high speed operation. When the piston reaches the point $L_2$, the piston begins to slow down its speed from $V_H$. At this time, the cavity of the mold is in the state just before its filling up to the full with the molten material. Within a subsequent short period the piston moves to the point $L_3$ slowing down its speed to $V_L$ that is the maximum speed capable of absorbing a shock to the molten material. This speed $V_L$ is maintained until the point $L_4$ at which filling up the molten material is completed. In FIG. 3, the piston speed is shown as being kept constant between the points $L_3$ and $L_4$. However, actual speed is decreased gradually according as the piston moves toward the point $L_4$.

Figure 1:
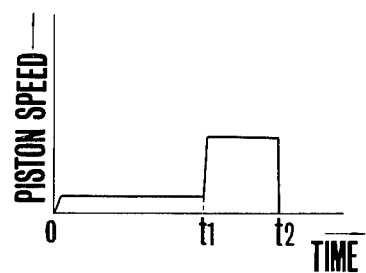
FIG. 1 is a graphical representation to show a typical prior art operating program of a piston speed for injecting a molten material into a mold under pressure.
Figure 2:
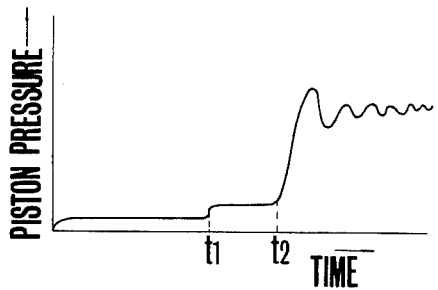
FIG. 2 is a graphical representation to show an example of pressure vibration observed in a prior art die casting process.

From the comparative study of FIGS. 1 and 3, it will be seen that the piston speed is lowered when the molten material has completely filled the mold in accordance with a program of injection as set forth above. Accordingly, the kinetic energy of the piston cannot become so large upon completion of filling up the mold cavity with the molten material comparing to the prior art. For instance, the pressure imposed on the piston is about 15 to 30 kg/cm² according to the present invention. This pressure is too small to produce the peak pressure for the molten material in the cavity. Even if peak pressure occurred, it would be too small to give casting fins to the product cast, and also too weak to eject the molten material from the interface between two halves of the mold. Further, the kinetic energy of the moving pressure oil upon completion of filling up the mold is naturally reduced in connection with the novel operation of the piston for injecting the molten material, so that pressure vibration is obviated, thus the damage to the product due to porousness or less densified solidification being prevented effectively.

Figure 4:
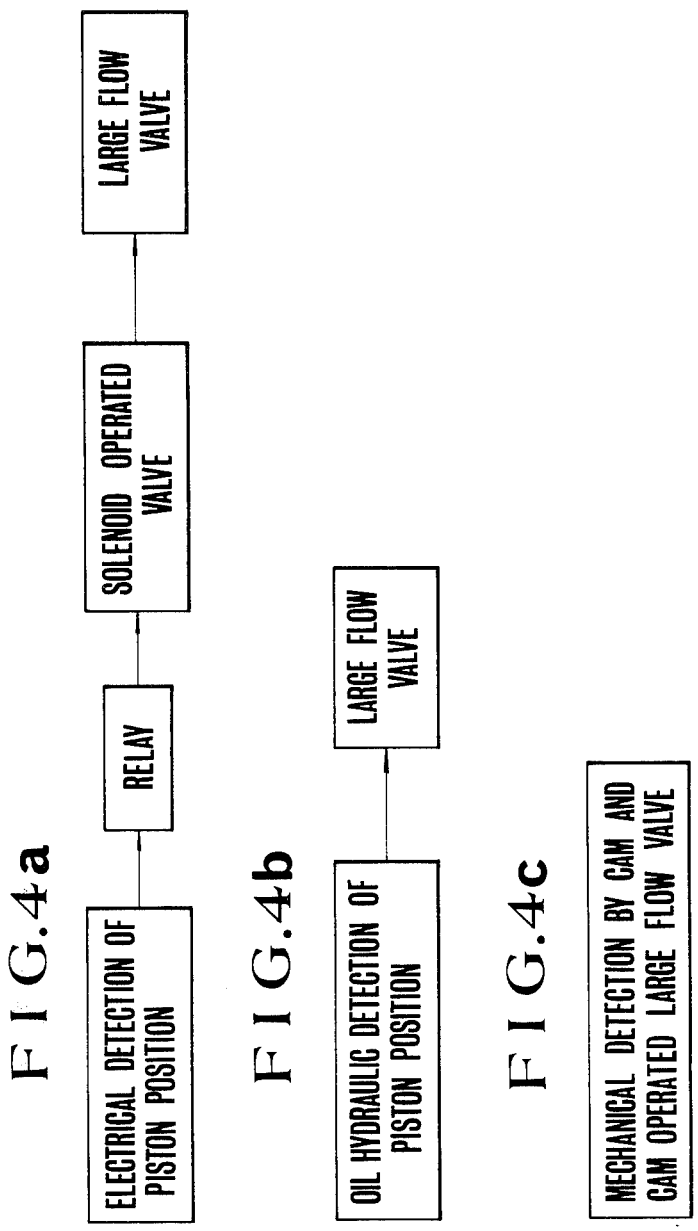
FIGS. 4a, 4b and 4c are block diagrammatical representations for analyzing a general way embodying the program shown in FIG. 3, FIGS. 5, 6 and 7 are graphical representations to show piston speed reducing program in terms of the piston speed vs time.

As the ways of slowing down the piston speed, there are three ways shown in FIGS. 4a, 4b and 4c respectively. FIG. 4a shows the first way wherein the position of the piston is electrically detected through the electric signal which is given when the piston comes in contact with a limit switch disposed at the position from which the piston begins to slow down its advancing speed. The signal above is then transmitted to a relay which in turn operates a solenoid operated valve, and eventually a large capacity oil hydraulic valve is operated by said solenoid operated valve, thereby selectively controlling the piston speed.

In accordance with the method of piston speed reduction as mentioned above, (a) it takes about 20/1000 sec. from the time of detection of the piston position to that of commencement of the speed reduction occurred subsequent to the solenoid operated valve operation. The high speed operated piston, however, can run a considerable distance in such a short period of time. Further, this period is always constant regardless of the magnitude of the piston speed, so that the position at which the piston begins to slow down its speed would be changed if the speed of the high speed operated piston is varied; (b) the distance $L_o$ from commencement of the speed reduction to completion of the same is expressed mathematically as follows.

$$L_o = \int_0^t v(t)\, dt$$

where $t$: time passed from commencement of the slowing down operation $v(t)$: piston velocity at a time $t$ In order to simplify the analysis of the problem, it is assumed that velocity $v(t)$ is expressed by an equation $v(t) = V_H \frac{1}{2} \cdot at$, where $a$ is further assumed constant. Based upon this assumption, the distance $L_o$ is expressed as the following equation, namely:

$$L_o = \frac{1}{2} a t^2$$

Figure 5:
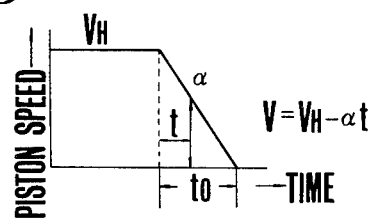

FIG. 5 is a graphical representation showing the piston velocity as a function of time, where the abscissa represents time while the ordinate the piston velocity. Now, letting the time from the beginning of the speed reduction to the end of the same be $t_o$, the distance $L_o$ required for this speed reduction is expressed as $$L_o = \frac{1}{2} a t_o^2$$

On the other hand, there is the following relation among $a$, $t_o$ and $V_H$, namely:

$$at_o = V_H$$

Therefore, the distance $L_o$ is expressed as $$L_o = \frac{1}{2} V_H t_o$$

Figure 6:
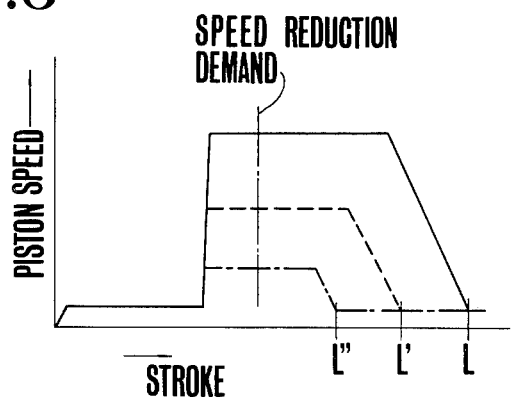

The time $t_o$ is nothing but the operation time of the oil hydraulic valve having a large flow capacity, so that it is always constant regardless of the speed of the high speed operated piston. Consequently, the distance required for completing the speed reduction of the piston is varied with the piston speed in the high speed operation. This is shown in FIG. 6. In the figure various distances Ls are shown in connection with various high speed piston operation. In order to overcome the difficulty with the varied piston running distance required for slowing down its speed, it is required that the position at which the piston receives an order for slowing down the speed thereof is varied in accordance with the piston speed in the high speed operation. However, even if the requirements above are satisfied, the operation of the apparatus would be complicated. Further, there may be another shortcoming wherein the stabilized piston operation could not be obtained due to the irregularity of the operation time of the solenoid operated valve and the relay, and due to the fluctuated speed of the piston in its high speed operation.

Figure 7:
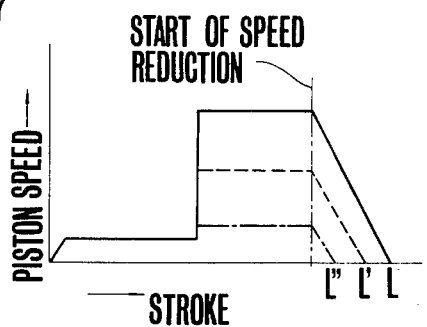

FIG. 4b shows another method of slowing down the piston speed wherein the position of the piston is detected at the time when the pressure in the cylinder has reached a predetermined value, at which time a large flow capacity valve is activated. This method is, however, accompanied by the phenomenon which has been discussed above as a fault of the method shown in FIG. 4a. FIG. 7 will explain this situation. Namely, the starting point of speed reduction can be set constant regardless of the piston speed in its high speed operation while the end point of the same is varied depending on the piston speed.

FIG. 4c shows still another method of the piston speed reduction wherein there is provided a cam which is fixed in the side of the piston rod, and said cam comes in contact directly with the large flow capacity valve at the time when the piston has come in a predetermined position, whereby the valve is controlled. According to this method, however, in case the piston is operated at a considerably high speed, even a slight contact made by the cam and the valve results in an abrupt closing of the valve, thus the speed is capable of started too early. In case of comparatively low speed operation, the speed reduction is begun after the valve is removed to a large extent through encounter with the cam, thus the commencement of the speed reduction being delayed. However, the method set forth above has an advantageous feature such that the end point of speed reduction is automatically controlled to make the piston position be identical to in either operation.

Reviewing comparatively the methods discussed so far, it will be understood that the methods of FIG. 4c is best. That is to say, the method of FIG. 4c provides the fastest response among the three ways, and also it provides a less fluctuated operation time in the operation of the oil hydraulic valve having large flow capacity, and further there is no fear of supposing an erroneous operation of the valve. In spite of advantages like these, due to the extremely large amount of the oil which must pass through the valve, for instance about 10,000 l/min in case of the die casting machine of the grade 600 ton, application of the method to the practical case is difficult.

Figure 8:
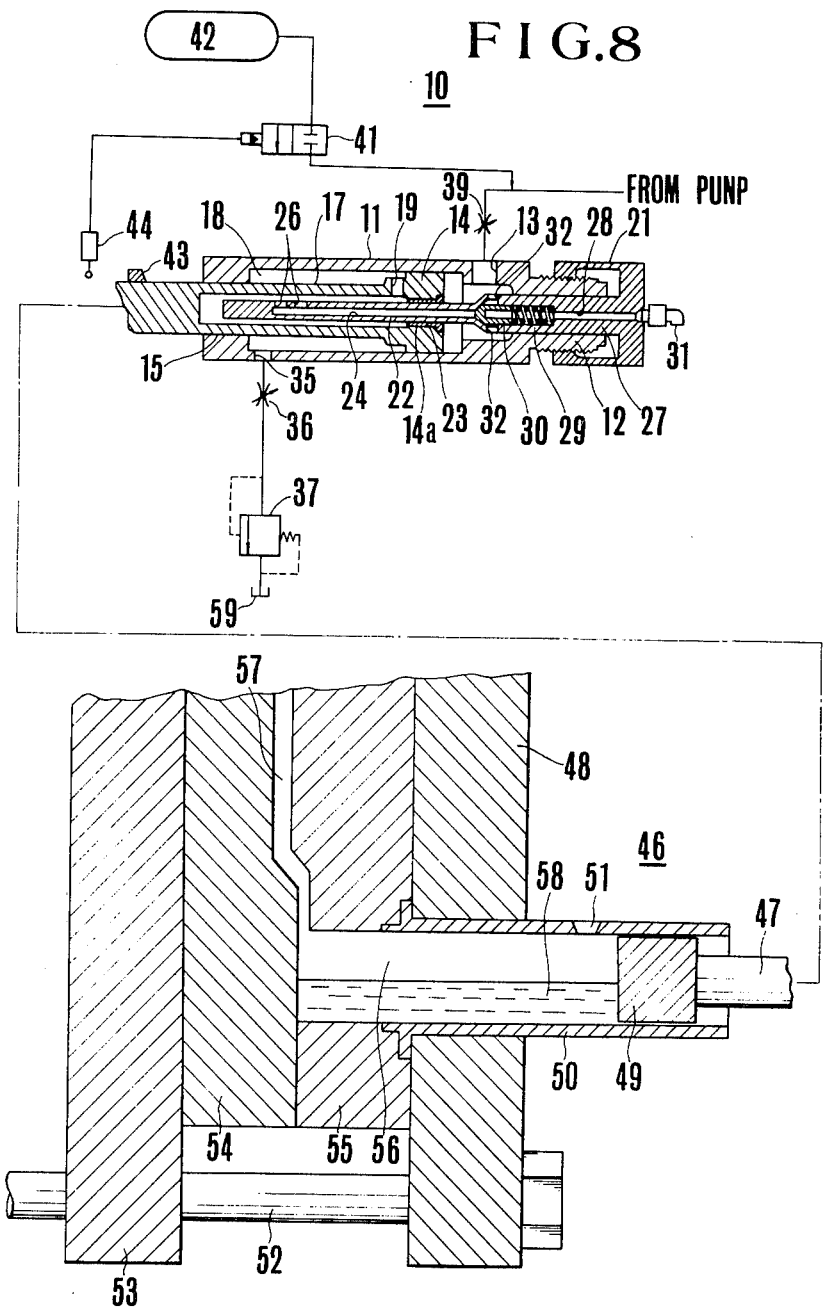
FIG. 8 is a cross sectional view of a molding system including an improved injection apparatus embodying the invention.

Consequently, the inventors have invented the injection apparatus for injecting the molten material into a metal mold under pressure which is constructed as shown in FIG. 8 and which represents further improvements over the apparatus disclosed and discussed in reference to FIG. 4a – FIG. 4c.

FIG. 8 is a longitudinal cross sectional side view of an injection apparatus 10 embodying the present invention and provided on an molding system. In the figure a reference numeral 11 designates the main body of a cylinder which has openings at both ends thereof.

One open end of the cylinder is provided with a coaxial cylinder having a smaller diameter than that of the parent cylinder 11 and having thread along the circumferential surface thereof, which is called a threaded portion 12 hereinafter. A port 13 for supplying the pressurized oil to said cylinder 11 is opened near said threaded portion 12. In the cylinder 11 there is provided a piston or piston head 14 slidably mounted therein. This piston 14 is connected with a piston rod 17 which is outwardly projected through the openings 15 provided at the other end of the cylinder 11. The piston rod 17 has a cut away portion 18 which is extended in the direction of the axis of the cylinder and is connected with a hole opened at the center of the piston 14. Further, this piston rod 17 is provided with another port 19 which is formed near the piston 14. The cut away portion 18 set forth above contains a hollow rod 22 projected from the center of a box nut 21, and said hollow rod 22 is made slidable through a seal member 23 attached to the center hole 14a of the piston 14. The above box nut 21 is made to couple with the threaded portion 12 on the cylinder 11 through the threads provided respectively thereon. Accordingly, the hollow rod 22 is disposed slidably and air-tightly penetrating through the inside of said threaded potion 12 of the cylinder 11.

On the other hand, the hollow rod 22 has a hollow portion 24 lying therein along the axial line thereof. The tip portion of the hollow rod far from the box nut 21 is provided with a plurality of ports 26 which are communicating with said hollow portion 24. The base portion 27 of said hollow rod 22 is made larger in its outer diameter than the tip portion of the rod 22. The base portion 27 has a hole 28 penetrating therethrough, having a step portion therein and further communicating with said hollow portion 24 from the center of said box nut 21. There is further provided a check valve 30 which is energized with the pressing force given by a spring 29 disposed in the step portion of said hole 28, thereby the check valve being made to cut off the communication between said hollow portion and the hole 28. The end portion of the box nut 21 is connected with a pipe 31 for connecting said hole 28 with an oil tank or pressure source through a selector valve not shown. The hollow rod 22 has a plurality of penetrating holes 32 at its base portion which is surrounding said check valve 30. On the other hand, a port 35 is bored at the place near the hole 15 through which the piston rod 17 is penetrating. This port 35 is connected with a relief valve 37 through a throttle valve 36.

The port 13 for supplying pressure oil into the main body of the cylinder 11 is connected with a pump for supplying oil from its reservoir through a throttle valve 39, and further connected with an accumulator 42 through said throttle valve 39 and a solenoid operated valve 41, of which open and shut operation is controlled with a limit switch 44 reacting upon a striker 43 projecting from the piston rod 17.

The piston 17 projecting from said cylinder 11 is connected to the shot plunger 47 of a shot cylinder 46 through a coupling (not shown). This shot cylinder 46 is fixed with a stationary platen 48 and has a plunger chip 49 connected to said shot plunger 47, shot sleeve 50 in which said chip 50 slides, and an injection port 51 provided on said sleeve 50. Further, said stationary platen 48 is provided with a moving platen which is arranged removably along a column, i.e. a guide rod 52. Between both platens above, there are arranged a moving mold half 54 and stationary mold half 55. The exit side of said shot cylinder 46 is connected to the cavity 57 formed by said mold halves through the path 56 for injecting the molten material which is provided on said stationary mold. In the figure the reference numeral 58 designates the molten material injected into the shot cylinder 46 through said port 51, while a numeral 59 designates a tank.

The operation of the embodiment constructed as above will be understood from the following explanation.

In the state shown in FIG. 8, when the pressure oil is supplied to the injection apparatus 10 embodying the invention from the port 13 through a pump (not shown) and the throttle 39, the piston 14 is advanced with the oil pressure to the left of the drawing. By this piston advance, the oil in the rod side of the cylinder tends to escape to the relief valve 37 through the port 35. However, if the setpoint of the relief valve 37 is made higher to some extent, the relief valve 37 would not be opened, thus the oil in the rod side would be caused to flow into the hollow portion 24 through the port 35 and also the port 26 of the hollow rod 22. The pressure caused by the oil having entered the hollow portion 24 pushes back the valve 30 against the elastic force of the spring 29 to introduce the oil to the head side of the cylinder through the openings 32, thereby a run-around circuit being formed. In the manner set forth above, the piston 14 can be advanced by means of a comparative small amount of pressure oil. The piston 14 is controlled such that the advancing speed thereof is regulated from the low level to the high level as it advances by means of operating the limit switch 44 and accumulator 42. Accordingly, to advance of the piston 14, the ports 26 are blocked with the seal member 23 one by one. This throttling effect given to the ports 26 acts to restrict the run-around circuit, thereby the pressure in the piston rod side is increased to open the relief valve 37 and further the piston speed is reduced to the level which is determined by the throttle 36. After the completion of the speed reduction above, the molten material completely fills up the cavity of the mold.

In the event that the piston 14 is desired to be pushed back to its original position, oil pressure is imposed upon the pipe 31 to close the check valve 30, and then the pressurized oil is supplied to the cylinder 11 through the port 35.

It should be noted that the hollow rod 22 and the box nut 21 are formed integrally in one structure and that said box nut 21 is screwed over the threaded portion 12 of the cylinder 11. The construction above makes it possible to control the starting point of speed reduction of the piston referring to molding condition desirable for goods to be produced. Namely, it is done by letting the hollow rod 22 go back and forth by turning the box nut 21 to set a proper position of the ports 26 to be sealed by the sealing member 23.

Figure 9:
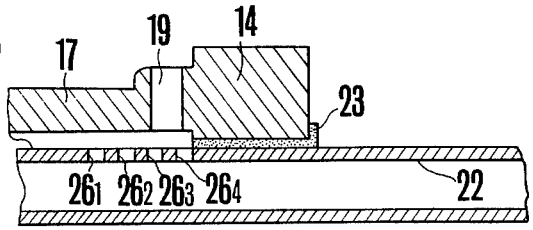
FIG. 9 is a cross sectional view of the part of the injection apparatus of this invention to show modification of port provided on a hollow rod.
Figure 10:
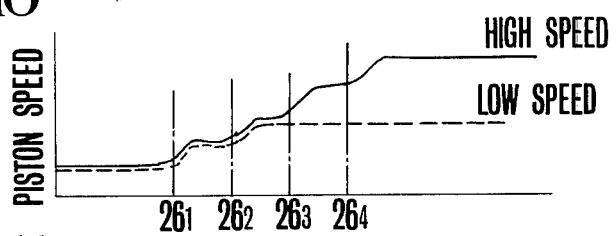
FIG. 10 is a diagrammatical representation for showing the relation between the port of the hollow rod and the piston stroke and is merely a graphical representation.

It should be noted that there may be provided more than two ports 26 although the embodiment explained above has only two ports. Also it should be understood that the shape of the port is not limited to a circle and it may take a shape other than circle, such as an elongated hole or the like. In other words, the important thing is not the number or the shape of the port, but the area of the port as a function of piston stroke. For instance, let us assume that there are provided four ports $26_1$ through $26_4$ as shown in FIG. 9. In case of a high speed piston operation, all the ports $26_1$ through $26_4$ are used for making the oil run around. Accordingly, the first slowing down is commenced upon shutting the port $26_4$, which is shown in FIG. 10. In comparison, in the case of a comparatively low speed piston operation, only two ports $26_1$ and $26_2$ are enough to make the oil run around, and the first slowing down is commenced when the port $26_2$ has been blocked. As set forth above and also shown in FIG. 10, it will be understood that the terminal point of the travelling piston is always made constant regardless the piston speed before its slowing down.

Further, it is possible to slow down the piston speed in step fashion by means of aligning several ports 26 axially and further disposing these ports 26 as a group at several portions on the hollow rod 22 along the axial length thereof. The ports 26 above may be arranged in a triangular form to constitute the port group above. When the port group above is disposed in the manner that the apex of the triangle directs to the rear side of the rod 22 in which the check valve 30 is located, the speed reduction is carried out slowly at first but then abruptly at the end. The apex of the triangle above may take an opposite position to the above, the mode of speed reduction at that time is reversed naturally. Furthermore, it will be understood that the same effect for speed reduction is obtained with the embodiment of the invention shown in FIG. 11, in which there is provided a tapered portion 68 having a constant inclination at the inner surface of the piston 14, and forming an open jaw toward the piston rod 17 from the opening of the piston or piston head 14. In the case above, it will be also understood that a single port is enough to give the same effect for reducing the piston speed. A reference numeral 62 in FIG. 11 designates a seal member, i.e. a piston ring sealing the gap between the piston 14 and the cylinder 11.

Figure 11:
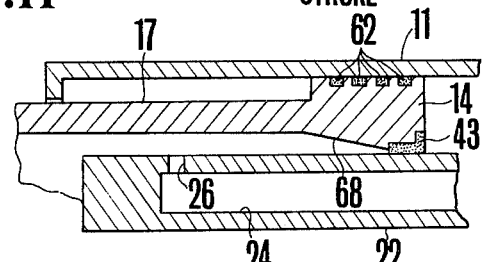
FIGS. 11, 12 and 13 are cross sectional diagrammatical representation showing various embodiments of this invention.

In the embodiments of the invention explained so far, there are provided a plurality of ports 26 as shown in FIGS. 8 and 9, and there are provided the tapered portion 68 as shown in FIG. 11. By these construction, the oil quantity passing through the ports 26 is made gradually smaller according to advance of the piston 14 and piston rod 17, and the starting point of the speed reduction of the piston or piston head 14 is made always constant regardless of the piston speed before its slowing down. Considering the function of the ports 26 and the tapered portion 68 above, they should be called a throttling device.

Figure 12:
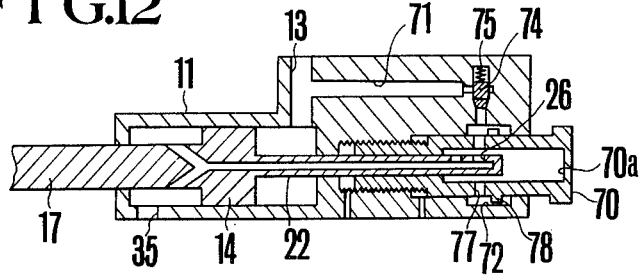
Figure 13:
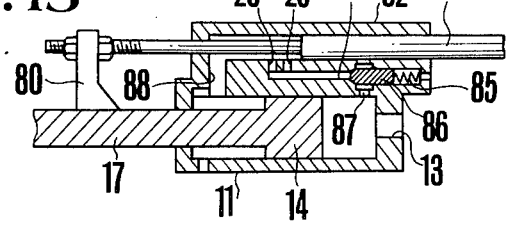

FIGS. 12 and 13 show another embodiments of this invention. In the figures the same parts and portions as those shown in FIG. 8 bear the like reference numerals, and the explanation thereon will not be made.

In the embodiment shown in FIG. 12, the piston or piston head 14 and the hollow rod 22 are integrally constructed as a single structure. However, the rod 22 is inserted slidably into the cylinder 11 at the head side thereof. This is opposite to the case of FIG. 8. Another cylinder 70 for controlling the speed reduction point is screwed adjustably in at the head side of the cylinder 11. The space 70a in said cylinder 70 receives the hollow rod 22 coming slidably therein. Further, a passage 71 communicating with the port 13 is formed at the head side of the cylinder 11. In the head side of the cylinder 11 and between said passage 71 and the space 72 containing said control cylinder 70 inserted therein, there is further provided a check valve 75 being under biased condition with a spring 75. A small hole communicating with the space 72 is bored on said control cylinder 70. It is entirely same as the case of FIG. 8 to connect the external components such as a relief valve and so forth with the port 35 provided on the cylinder 11. It should be noted that a reference numeral 78 designates a stopper for preventing the control cylinder 70 from its going out of the cylinder 11 excessively. According to the embodiment constructed as above, the pressurized oil supplied through the port 13 actuates the piston 14 to force the oil in the rod side into the control cylinder 70 through the hollow rod 22. Further, the oil in said cylinder 70 is forced to flow through the small hole 77 to open the check valve 74, thereby the oil flows into the head side of the cylinder 11 through the passage 71 to complete a runaround oil hydraulic circuit. In the manner above, the piston 14 begins to slow down its speed on its way of high speed travelling when at least a port 26 has been blocked with the control cylinder 70.

FIG. 13 shows still another embodiment of this invention in which the hollow rod 22 is disposed in parallel with the piston or piston head 14 and both of them are connected together through a connecting member 80, in which there is further provided a passage 83 having the port 26 in a casing 82 formed integrally as a part of the cylinder 11, and in which there is further provided a check valve 86 at the point where said passage 83 meet with the path from the head side of the cylinder 11, said check valve 86 being biased with a spring 85. As shown in FIG. 13, rod 22 is disposed in a cavity in the casing 82 with passage 83 selectively joining the cavity in the casing 82 with a cavity in the cylinder 11. In accordance with the embodiment constructed as above, when the pressurized oil is supplied from the port 13 of the cylinder 11, the piston 14 begins to advance. The piston rod 17 also begins to move to the left (in the figure) in response to the movement of the piston 14. At the same time, the oil in the piston rod side is forced to flow toward the check valve 86 through the passage 88, port 26 and passage 83, thereby the check valve 86 being opened to return the oil to the head side of the cylinder 11 through the hole 87. In the manner above, a run-around oil hydraulic circuit is accomplished, thereby the piston 14 being advanced until the hollow rod or tube 22 blocks a port 26. Namely, the speed reduction of the piston or piston head 14 is begun when at least a port 26 has been blocked with the rod 22.

As will be understood from the explanation above, in the embodiments shown so far, the piston speed is made to slow down before the molten material completely fills up the mold and there is provided a passage which is capable of acting to reduce the speed of the piston rod directly in response to advancing motion of piston rod itself. There is further provided an adjusting means which is capable of adjusting the position of the passage which is blocked according to the piston rod advancing. By the novel construction above, it becomes possible to select the desired speed reducing conditions good for the product to be cast or molded considering the sort of product, material to be used and so forth. Further, according to the invention, there is provided a passage in the run-around oil hydraulic circuit, and said passage is made to be blocked when the piston rod is advanced. Furthermore, there is provided a throttling structure capable of restricting gradually the quantity of oil passing through said passage. By the novel structure above, it becomes possible to make the terminal point of speed reduction be constant regardless of the piston speed before its slowing down, thereby the peak pressure being reduced, and occurrence of pressure vibration being prevented. Thus, the improvements disclosed hereinabove are achieved.

Now, referring to FIG. 8 again, it should be noted that the embodiment shown in the figure involves a problem to be solved which is concerned with an oil hydraulic circuit.

That is to say, according to the embodiment shown in FIG. 8, a power loss must be expected. This power loss is caused by a considerably large amount of oil which is flowing out of the throttle 36 in the run-around oil circulation. In order to overcome the difficulty above, there must be provided a valve which acts to block the oil from the port 35 of the cylinder 11 in the run-around operation while it is kept opened during the speed reducing operation of the piston. The valve above is further demanded that it must respond as quickly as possible when the piston is operated in higher speed level.

Figure 14:
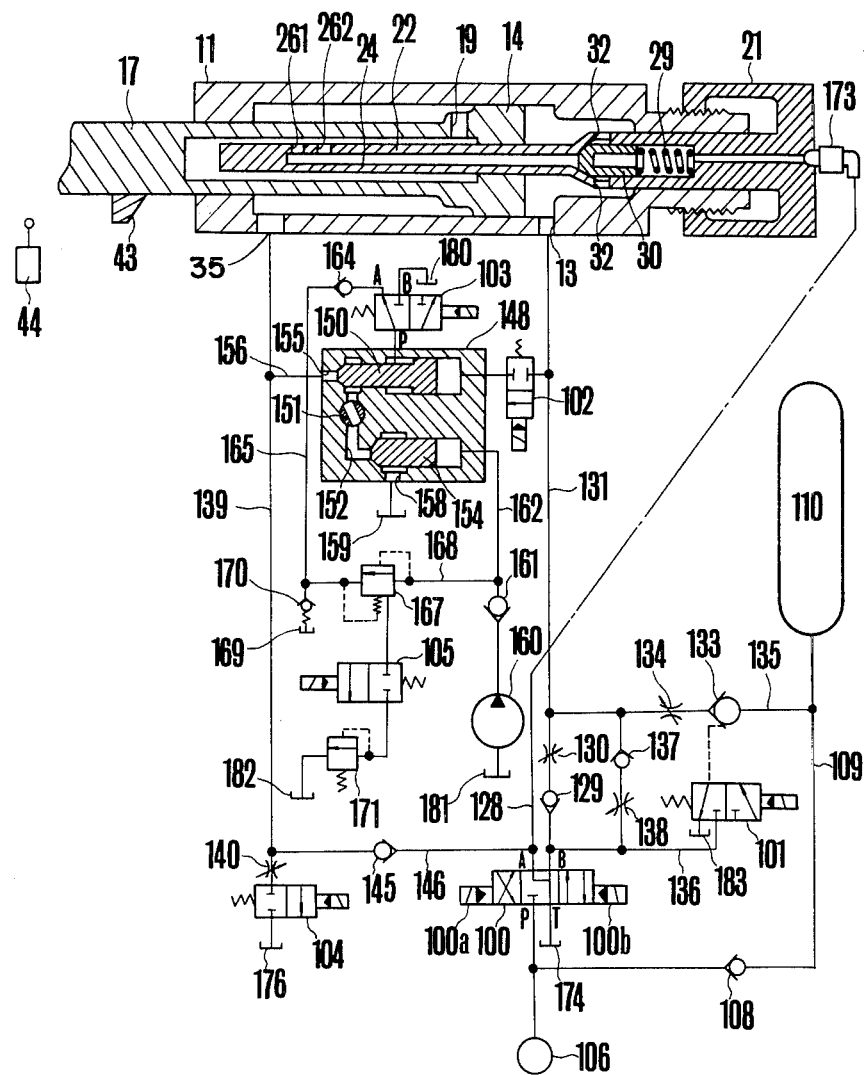
FIG. 14 is a schematic diagrammatic representation showing another embodiment of the invention.

For meeting the requirements above, an embodiment of this invention may be proposed as shown in FIG. 14. It will be better understood from the following detailed explanation taken in conjunction with the figure. In the figure, the same parts and portions as those shown in FIG. 8 bear the like reference numerals, and no further explanation thereon will be made.

Now, reference numerals 100 through 105 designate solenoid operated valves. The P-port of the valve 100 is connected to a pump 106 and at the same time connected to an accumulator 110 through a check valve 108 and a pipe 9. The A-port of said valve 100 is connected to said connecting pipe 31 through a pipe 128. The B-port of said valve 100 is connected to the port 13 at the head side of the cylinder through a check valve 129, a throttle 130 and a pipe 131. The pipe 109 for connecting the valve 100 with the accumulator 110 and said pipe 131 are connected with each other through a piping 135 which contains a throttle 134 and a pilot check valve 133 en route. The solenoid operated valve 101 is connected to a pipe 136 which is connecting said valve 133 to the pipe 131. A check valve 137 and a throttle 138 are intervening between the pipings 131 and 136.

The port 35 of the cylinder 11 is connected to the solenoid operated valve 104 through a pipe 139 and the valve 140. This pipe 139 and the pipe 128 are connected with each other through a pipe 146 having a check valve 145 en route.

There is also provided a control valve 148 between the pipings 128 and 139. The control valve 148 above is further provided with a valve 150 which is opened when the pressure in the rod side of the cylinder 11 is made higher than that in the head side of the same, a throttle valve 151 for adjusting the speed, a passage 152 and a relief valve 154 for controlling the output of the piston 14. A port 155 in the valve 150 side is connected to the pipe 139 through a pipe 156 while a port 158 in the relief valve 154 side is opened to a tank 159. Further, a solenoid operated valve 102 is provided between the rear side of the valve 150 and the pipe 131. The oil from a pump 160 is supplied to the rear side of the relief valve 154 through a check valve 161 and a pipe 162. The rod side of the valve 150 is connected to the P-port of the solenoid operated valve 103 while the A-port of the valve 103 is connected to a pipe 165 through a check valve 164. The pipe 165 above and said pipe 162 are connected with each other through a pipe 168 having a relief valve 167 en route. One end of the pipe 165 is connected to a check valve 170 which is further connected to a tank 169.

The vent port of the relief valve 167 is connected to another relief valve 171 through the solenoid operated valve 105. Reference numerals 180 through 183 represent various tanks.

Now, let us explain the operation of the apparatus constructed as above embodying the invention.

At first, the solenoid 100a of the solenoid operated valve 100 is actuated. Then, the ports P and B, and the ports T and A are respectively coupled with each other. By this coupling, the oil hydraulic oil from the pump 106 is forced to flow through the check valve 29, throttle 130, pipe 131 and finally reaches the head side of the cylinder 11 via the port 13 of the same to make the piston start moving ahead. At the same time, the oil which is constituting a back pressure for the check valve 30 from the side of a revolving valve 173 provided on the box nut 21 is released through the pipe 128 to the tank 174. At this time another solenoid operated valves 102 and 105 are samely made to be in ON position. When the piston is made to progress, the oil in the rod side tends to escape from the pipe 139 through the port 35. However, the valve 150 provided in the control valve 148 is receiving the oil hydraulic pressure from the pump 106 through the solenoid operated valve 102. Accordingly, the oil trying to escape is blocked with the above pressure which is equal to that in the head side of the cylinder. Further, the solenoid operated valve 104 is in OFF position, so that said oil cannot get out from the valve 104. Consequently, the oil is obliged to flow into the port 19 of the piston 14, and further into the inside space 24 of the hollow rod 22 through the ports $26_1$ and $26_2$ provided on the rod 22. When the pressure of the oil above is increased, it pushes the check valve 30 back against the pressing force of the spring 29, thereby the oil coming into the head side of the cylinder 11 through the small hole 32. In the manner as explained above, the run-around circuit is established thereby the piston 14 is made to advance with a comparatively small amount of the oil.

When the piston or piston head 14 is advanced and the striker 43 projected from the piston rod 17 hits on the limit switch 44, the valve 101 is turned to ON position, and the check valve 133 is opened, thereby the pressurized oil in the accumulator 110 is flown into the cylinder head with a large amount through the throttle 134, pipe 131 and port 13, thereby the piston or piston head 14 beginning to advance with high speed. According as the ports $26_1$ and $26_2$ on the rod 22 are blocked in the order of the ports $26_2$ and $26_1$, the oil pressure in the rod side begins to increase and at last it becomes higher than that in the head side, thereby the valve 150 being pushed to open and the oil being released from the port 158 to the tank 159 travelling through the throttle 151, passage 46 and relief valve 154. By this operation, the piston starts reducing its speed abruptly. As the ports $26_1$ and $26_2$ have been completely blocked out, the piston or piston head 14 travels at the speed which is controlled with the throttle valve 151. On the other hand, the piston speed is controlled with the back pressure of the relief valve 154 as the cavity has been completely filled up.

As the cooling period for the product cast or molded has passed away and a signal for demanding to open the metal mold is transmitted, the solenoid operated valve 105 is turned to the OFF position while the valve 104 is turned ON. As a result of this, the relief valve 167 is cut off from another relief valve 171, so that the oil pressure pushing said relief valve 154 is enhanced up to a set pressure for the relief valve 167. Accordingly, said relief valve 154 is pushed back to close the passage through which the oil in the rod side may escape to the tank 159. At the same time, said oil in the rod side is released to the tank 176 through the pipe 139, throttle 140 and valve 104. In the manner described above it is completed pushing out the biscuit portion of the product in the metal mold.

When the piston has moved up to its advance limit, it is maintained at that limited position for a short period determined by a timer not shown.

At that time if the solenoid operated valve 103 is newly made to move into the ON position, the P and B ports of this valve would be communicated with each other, thereby the escaping oil in case of closing operation of the valve 150 being released to the tank.

On the other hand, since the valve 102 is kept in the ON position, the pressure in the head side is led to the valve 150. Consequently, as the oil in the rod side is released through the valve 104 to the tank 176, and the pressure thereof begins to go down, the valve 150 is being closed gradually, and finally closed to go back to the initial state at the start.

Retracting motion of the piston will be described as follows. At first, the solenoid 100b of the valve 100 is actuated to couple its P port with its A port, and also to couple its P port with its B port. However, all the solenoid operated valves other than above are taking OFF position at that time. Consequently, the pressurized oil from the pump 106 is supplied through the pipe 128 to the check valve as the back pressure thereof, and at the same time it is supplied to the port 35 of the cylinder 11 through the pipe 146, check valve 145 and pipe 139. At this time, since the valve 150 is closed, the pressurized oil cannot enter the control valve 148. Therefore, the piston 14 is made to go back. In response to this retraction, the oil in the head side flows out through the pipe 131, and then, is released to the tank 174 via the check 137 and throttle 138, thereby the piston being made to go back at the speed regulated with the throttle 138.

As explained, in accordance with the above embodiment of this invention, the oil released from the port 35 of the cylinder 11 is completely blocked in the run-around operation by providing the control valve 148 while the oil is released in the piston speed reducing operation, and furthermore the control valve 148 can follow any mode of the piston operation regardless of fast operation or slow one. Accordingly, the piston speed can be controlled such that it slows down immediately before the cavity is filled up to the full, thereby peak pressure being reduced, pressure vibration being obviated, the product quality being improved, the pressing force for the mold being made comparatively smaller and the safety operation being ensured.

Figure 15:
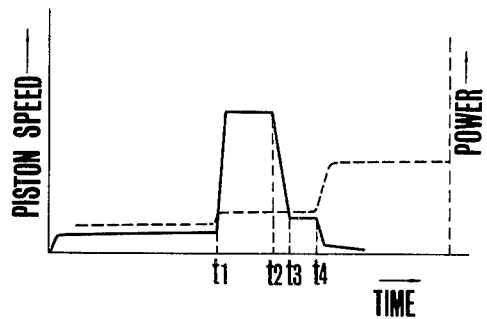
FIG. 15 is a graph showing characteristics of piston speed vs time and the same of the output vs time.

Now, let us discuss about the relation between the piston speed and the power (pressure) of the piston. FIG. 15 shows variation of the piston speed and the power of the piston for the change of time. The graph above tells that the high speed piston operation is commenced at the time $t_1$, that the speed reducing operation is started at the time $t_2$ which is immediately before the cavity is filled up to the full and is terminated at the time $t_3$, and that filling-up operation of the molten material is completed at the time $t_4$ until which the piston speed is kept constant.

On the other hand, FIG. 15 shows the piston power varied with time progress by a dotted line. The power is increased slightly at the time $t_1$ while it is abruptly elevated, and its elevation is completed at the time which is immediately after completion of filling up the cavity to the full. Then, the elevated pressure is kept as elevated for a period predetermined.

Figure 16:
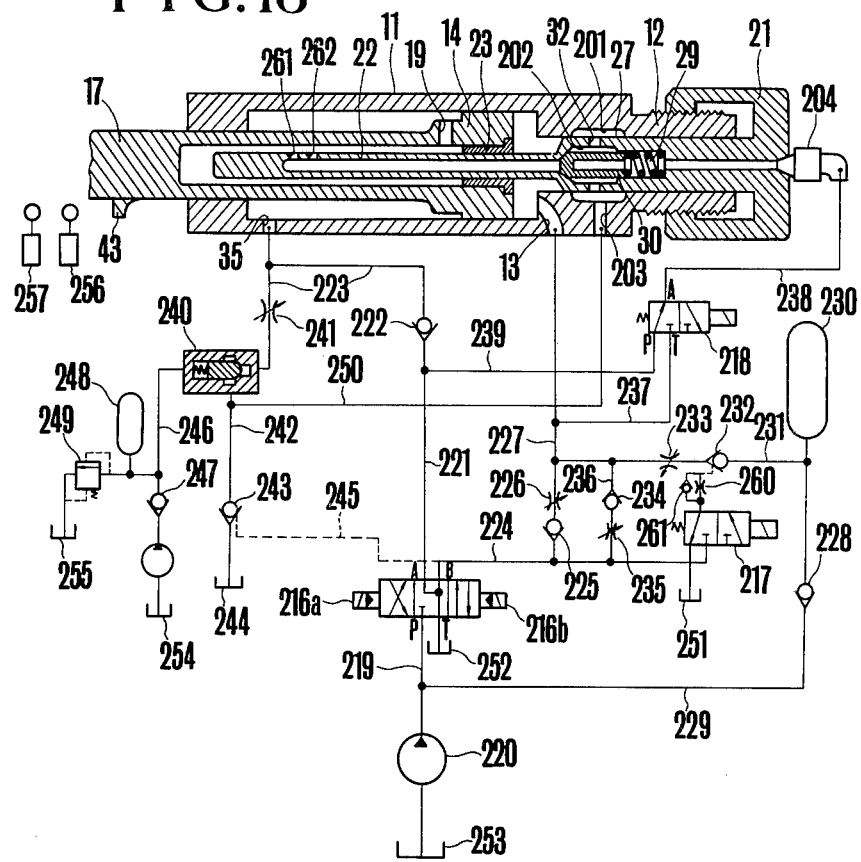
FIGS. 16 and 17 are schematic diagrammatical representations showing still another embodiments by the invention.

FIG. 16 shows another injecting apparatus embodying the invention which may be used in the system such as a die casting machine, an injection molding machine or the like.

Now, let us explain the above embodiment in detail referring to FIG. 16. In the figure, the same parts and portions as those shown in FIG. 8 are bearing the identical reference numerals.

In the figure, a reference numeral 201 designates a small space which is formed in the rear portion of the cylinder 11. The space 201 communicates with the inner space 202 of the hollow rod 22 through the small hole 32 which is provided at the base portion 27 of said rod 22. The cylinder 11 has a port 203 which communicates with said small space 201. The rear tip portion of the box nut 21 are provided with a rotating connector 20. Reference numerals 216 through 218 represent a solenoid operated valve. The P-port of the solenoid operated valve 216 is connected to a pump 220 through a pipe 219 while the A-port of the same is connected through a pipe 221 and a check valve 222 to a pipe 223 connected to the port 35. The B-port of the valve 216 is connected to the pipe 224. One end of this pipe 224 is connected to the pipe 227 having a check valve 225 and the throttle 226 on the way thereof, while the other end of the same is connected to the port 13 of said cylinder 11.

On one hand, the pipe 219 is connected to an accumulator 230 through a pipe 229 having a check valve 228 in its route. Said accumulator is further connected to the pipe 27 through a pipe 231 having a check valve 232 provided with a pilot and a throttle 233 on its way. The solenoid operated valve 217 is provided intervening between the check valve 232 and the pipe 224. Further, a pipe 236 including a check valve 234 and a throttle 235 in its route is provided intervening between said pipes 227 and 224. A pipe 237 is branched from the pipe 227 to be connected to the T-port of the solenoid operated valve 218. The rotating connector 24 set forth above and the A-port of the valve 218 are connected to each other through the pipe 238. Another pipe 239 branched from the pipe 221 is connected to the P-port of the solenoid operated valve 218.

On the other hand, the pipe 223 from the port 35 of the cylinder 11 is connected to a relief valve 240 through a throttle 241, and said relief valve 240 is further connected to the tank 244 through a pilot check valve 243 to which a pipe 242 is connected. The pilot pressure of said pilot check valve 243 is supplied through a pipe 245 branched from said pipe 224. The back pressure of the relief valve 240 is supplied by the pump 247 through a pipe 246 to which an accumulator 248 and a relief valve 249 are connected respectively. Reference numerals 251 through 255 designates tanks, numerals 256 and 257 represent limit switches struck by the striker 43, and numerals 260 and 261 designate a throttle and a check valve respectively.

The operation of the embodiment constructed as above will be better understood from the following explanation.

The steps of operation is started by making the advancing side solenoid 216a of the solenoid operated valve 216 into the ON position. By this first step, the ports P and B, and the ports A and T are communicated with each other. Consequently, the pressurized oil from the pump 220 is led through the pipe 224, the check valve 225 and the throttle 226, and finally reached the port 13 of the cylinder 11 to enter the head side of the cylinder 11, thereby the piston 14 being made to move ahead. At this time the oil in the rod side acts upon the relief valve 240 by passing through the pipe 223 and the throttle 241 from the port 35, but it cannot open said relief valve 240 since its pressure is too small to do so. Consequently, the oil in the rod side flows through the port 19 of the piston 14 and the ports $26_1$ and $26_2$ of the hollow rod 22, and acts upon the check valve 30 to open thereof against the pressing force of the spring 29, and finally reaches the tank 244 from the pipe 250 through the small hole 32, the small space 201 and the port 203. At this time the pilot check valve 243 is kept opened by the pressure supplied through the pipe 245, so that the oil in the pipe 250 is made to flow into the tank 244. The back pressure to the check valve 30 is not applied at this stage, so that the check valve 30 may be opened by a force capable of overcoming the pressing force of the spring 29. In the manner explained as above the piston 14 is made to progress at a comparatively low speed controlled by the throttle 226.

When the piston 14 moves ahead and the striker 43 provided thereon has struck the limit switch 256, the solenoid operated valve 217 is turned ON, thereby the pilot check valve 232 being opened. Consequently, the pressurized oil from the accumulator 230 is flown with the quantity controlled by the throttle 233 into the cylinder 11 from the port 13 through the pipe 227, thereby the piston 14 being advanced with high speed.

On one hand, when the piston 14 is advanced further, the seal member 23 of the piston begins to block the ports $26_2$ and $26_1$ provided on the hollow rod 22 in the order as above. By this operation, the pressure of the oil flowing through the port 19 of the piston 14 is elevated. This pressurized oil flows to the relief valve 240 through the port 35 and the throttle 241, and then opens said relief valve 240 to release itself to the tank 244. Accordingly, when the ports $26_1$ and $26_2$ are blocked, the oil pressure in the rod side abruptly increased, thereby the advancing piston receiving an abrupt braking action. After this, the piston is advanced at a comparatively low speed which is controlled with the throttle 241, and then filling up the cavity with the molten material is completed.

When the molten material injected is completely cooled to solidify, a signal for opening the metal mold is transmitted to the valve 218 to make it take ON position. Immediately after the valve 218 is made ON, the piston 14 advances beyond the position where the ports $26_1$ and $26_2$ are provided. Consequently, the head side of the piston is made to communicate with said ports $26_1$ and $26_2$, thereby the oil in the rod side being not allowed to enter the inside of the hollow rod 22.

On the other hand, since the solenoid 216a of the solenoid operated valve 216 takes ON position as well as another solenoid operated valve 217, according as the metal mold is opened, the piston 14 is further advanced to push out the biscuit portion of the product molded. When the piston 14 is progressed almost to the limited position, the striker provided thereon comes to strike the limit switch 257, thereby the valve 217 being made OFF, and the valve 216 being changed over to make its solenoid 216b be in ON position. Consequently, the ports P and A, and B and T are made to communicate each other, thereby the pilot check valves 232 and 243 being shut as well as the check valve 30. As a result of this, the pressurized oil from the pump 220 is made to flow into the rod 17 side of the piston through the pipe 221, the check valve 222 and the port 35, thereby the piston being made to go back. At the same time the oil in the head side is flown through the port 13, the pipes 226 and 236, the check valve 234 and the throttle 235. Finally it reaches the valve 216 and is released into the tank 252. In the process explained as above, one cycle of the piston going back and forth is completed.

As explained above, the piston slows down its speed immediately before the completion of filling up the mold cavity with the molten material according to the manner shown in FIG. 15. Further, in the embodiment explained above, the oil hydraulic circuit is constituted with a single acting circuit instead of a run-around circuit, so that the circuit is simplified more than the run-around circuit. Still further, in the high speed operation, the pressurized oil from the accumulator is made to act only upon the head side of the piston to enhance the power of piston, so that the piston can overcome the resistance which is given against the piston when it forces the molten material into the metal mold, and also the piston can be operated with high speed.

Figure 17:
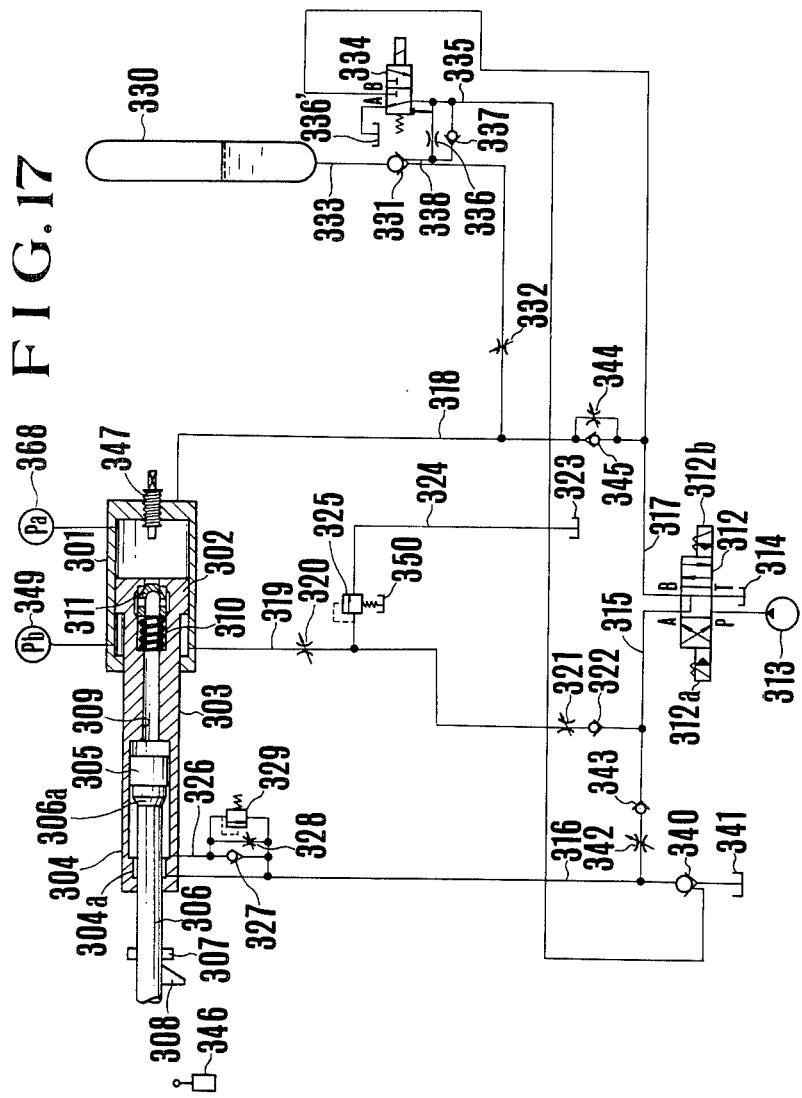

FIG. 17 shows still another injection apparatus embodying the invention for use in the system such as a die casting machine or the like wherein two kinds of injection cylinder are combined to slow down the piston speed immediately before the cavity is filled up to the full with the molten material.

In the figure, a reference numeral 301 designates a slow speed operated cylinder having a large diameter, which contains a piston 302 slidably mounted therein. The piston 302 above is provided with a ram 303 which further contains a fast operated cylinder 304 at the tip portion thereof. Said fast operated cylinder 304 is provided with a piston 305 having a piston rod 306. At the tip portion of said piston rod 306, a stopper 307 is provided thereon adjustably on its position, and a striker 308 is also provided thereon, while the striker 308 is located at the position further than said stopper 307 viewing from the cylinder side. Further, at the center of said ram 303, there is provided a passage 309 which extends to along the axis of said ram 303 to communicate the cylinders 301 and 304. This passage 309 is further provided with a check valve 311 at its rear portion, and said check valve 311 is always kept active by the spring 310 to close said passage 309. It should be noted that said check valve 311 might be replaced by a selector valve, should it have same function as the check valve of this embodiment.

On one hand, a reference numeral 312 designates a four directional selector valve of which P- and T- ports are connected to a pump 313 and a tank 314 respectively. Its A-port is connected to a small space 304a through pipes 315 and 316. Said small space 304a is formed at the tip portion of said cylinder 304 and is capable of acting as a cushion. B-port of the selector valve 312 is connected to the head side of said cylinder 301 through pipes 317 and 318.

The rod side of the cylinder 301 is connected to a pipe 315 through a pipe 319 which has variable throttles 320 and 321, and a check valve 322 on its way. From the pipe 319 above, another pipe 324 branches off placing its foot between said variable throttles 320 and 321, and is connected to a tank 323. The pipe 324 has a relief valve 325 intervening therein. Furthermore, the piston rod side of the cylinder 304 is connected to a pipe 316 through a pipe 326 having a check valve 327, a variable throttle 328 and a relief valve 329 which are connected thereto in parallel relation as shown in the figure.

Referring now to the right side of FIG. 17, a reference numeral 330 designates an accumulator which is connected to said pipe 318 by means of a pipe 333 having a pilot check valve 331 and a variable throttle 332 en route. The pilot pressure for this pilot check valve 331 is led from a three directional selector valve 334. The T-port of said selector valve 334 is connected to a pipe 335, the A-port of the same is connected to a tank 336 and further the B-port of the same is connected to the pipe 317. From the pipe 335 above, a pipe 338 is divided which has a throttle 336 and a check valve 337 intervening en route. Said pipe 338 is adapted to supply a pilot pressure to said pilot check valve. Further, said pipe 335 is connected to said pipe 316 at the end thereof and is adapted to lead a pilot pressure to said pilot check valve 340. Consequently, the operating oil in said pipe 316 is released to the tank 341 by means of opening said pilot check valve 340.

Furthermore, said pipe 315 has a variable throttle 342 and a check valve 343 intervening en route, and samely said pipe 318 has a variable throttle 344 and a check valve 345 intervening en route. Further, there is provided a metal member 347 which is screwed in at the rear end of said cylinder 301 and is adapted to control the stroke of the piston 302. In the meantime, it should be noted that said three directional selector valve 334 is changed over when the striker 334 projected from the piston rod 306 has struck the limit switch 346 located at a predetermined position. Reference numerals 348 and 349 designate pressure gauge, and another numeral 350 represents a tank.

The operation of the embodiment constructed as above will be better understood from the following explanation.

At first, energizing the advance side solenoid 312a of the four directional selector valve 312, the communication between the P- and B-ports thereof is obtained, thereby the operational oil from the pump 313 flowing through the pipe 317, the throttle 344 and the pipe 318 to the head side of said cylinder 301. At this time, since the pilot check valve 340 and the check valve 311 are kept closed, the operational oil in the piston rod side of the cylinder 304 cannot be released, so that the ram 303 is made to progress together with the piston 305. In this progression, the operational oil in the rod side of said cylinder 301 is returned to the tank 323 through the pipe 319, throttle 320, relief valve 325 and pipe 324. The progressing speed in this low speed operation can be arbitrarily selected by means of adjusting the throttle 344.

Now, letting the pressure in the rod side of the cylinder 301 progressing at low speed be $P_b$, setpoint of the relief valve 325 be $P_R$, and the differential pressure at the front and rear side of the throttle 320 be $P_{Cl}$. In these pressures above there is a following relation expressed as follows.

$$P_b = P_R + P_{Cl} \tag{1}$$

Meanwhile, the pressure Pa in the head side of the cylinder 301 is expressed by the following equation.

$$Pa = \frac{F_1}{A} + P_b \frac{B}{A} \tag{2}$$

where $A$ represents the cross sectional area of the head side of the cylinder 301, $B$ the cross sectional area of the rod side of the same and $F$, the running resistance for the ram 303 in the low speed operation.

When the striker 308 provided on the piston rod 306 travelling at low speed hits on the limit switch 346 the three directional selector valve 334 receives a signal therefrom to communicate the T-port with the B-port thereof. By this operation, the working oil from the pipe 317 is led through the throttle 336 and the pipe 338 to the pilot check valve 331 to open the same. The working oil from the accumulator 330 is led through the pipe 333, the pilot check valve 331, the throttle 332 and the pipe 318 and reaches the head side of the cylinder 301. At the same time the working oil from the pump 313 is led through the pipe 335 to the pilot check valve 340 and acts as a pilot pressure to said valve 340 to open thereof, so that the working oil in the rod side of the cylinder 341 is released to the tank 341, thereby the check valve 311 being made to open. By this operation, the working oil flown to the head side of the cylinder 301 from the accumulator 330 flows further to the head side of the piston 305 through the passage 309 to actuate the piston rod 306 to run fast. The high speed operation above is controlled with the throttle 332 and the speed of the piston rod is arbitrarily selected by adjusting said throttle 332. In this high speed operation, the pressure in the head side of the cylinder 301 comes to be balanced with the increase in the running resistance of the ram 303. That is to say, the pressure Pa in the head of the cylinder 301 is expressed as follows.

$$Pa = F_2/C \tag{3}$$

where $C$ represents the cross sectional area of the head side of the piston 305, and $F_2$ the running resistance for the ram 303 in its high speed travelling. Meanwhile the pressure Pb in the rod side is expressed as follows.

$$Pb = Pa\frac{A}{B} - Pa\frac{C}{B} = Pa\frac{A-C}{B} \tag{4}$$

Further, since A, B and C have a relation A-C>B among them, Pb is made larger than Pa (Pb > Pa), accordingly.

At this time, the ratio of the cross sectional area of the cylinder 301 to the same of the cylinder 304 and the setpoint of the relief valve 325 are selected to result in a relation Pb < $P_R$, so that the ram 303 does not make any advance and is kept stood still during the speed operation of the piston rod 306.

When the piston rod 306 is further advanced to reach the tip portion of the cylinder 304, the tip portion of the piston 305 comes to enter into the small space 304a of the cylinder 304. Since said space 304a works as a cushion for said piston 305 coming therein, the piston 305 is made to slow down its speed. The character of the cushion above can be controlled by means for the relief valve 329 and throttle 328. A reference numeral 306a designates a taper portion which is provided at the base portion of piston rod 306. This taper portion 306a is adapted to enhance the cushioning effect by said small space 304a.

When cushioning action comes into force, the pressure in the rod side of the cylinder 304 is increased, and at the same time, the head side pressure of the cylinder 304, i.e. the pressure Pa in the head side of the cylinder 301 which is communicating with said cylinder 304 through the passage 309, is also increased. Correspondingly, the pressure Pb in the rod side of the cylinder 301 is increased. When this pressure Pb is elevated up to the setpoint of the relief valve, the piston 302 begins automatically to move ahead again. At this time, there is no relative motion between the pistons 302 and 305. In other words, they move as a one body and travel the remaining stroke until the mold is filled up with the molten material to the full.

At that time, the pressure Pb in the rod side of the cylinder 301 is expressed by the following equation.

$$Pb = P_R + P_{C2} \qquad (5)$$

where $P_{C2}$ designates a differential pressure between the rear and front side of the throttle valve 320 (the differential pressure upon re-advancing), and $F_3$ a running resistance (upon re-advancing), while the pressure pa in the head side is expressed as:

$$Pa = Pb\frac{B}{A} + \frac{F_3}{A} \qquad (6)$$

Figure 18:
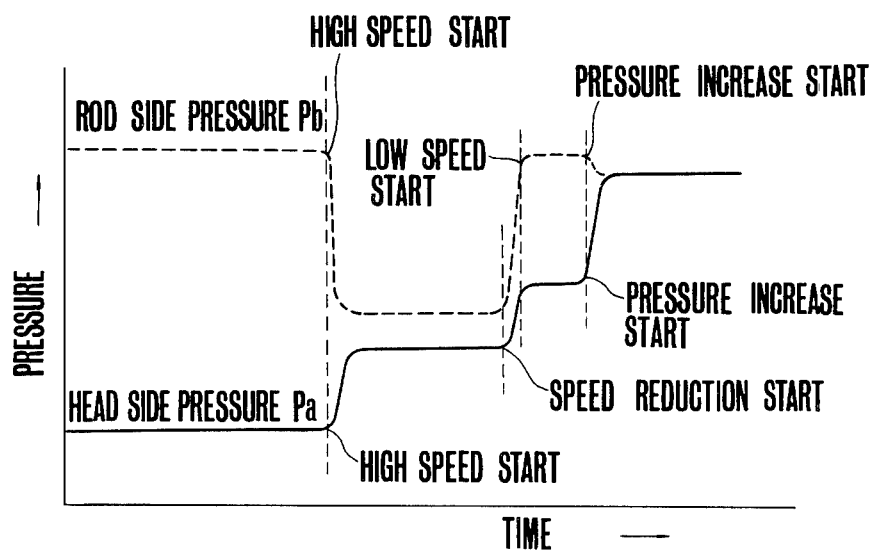
FIGS. 18 and 19 are graphical representation as to pressure vs time characteristics for explaining the operation of the embodiments shown in FIG. 17, FIGS. 20 and 21 show still another embodiments of this invention.
Figure 19:
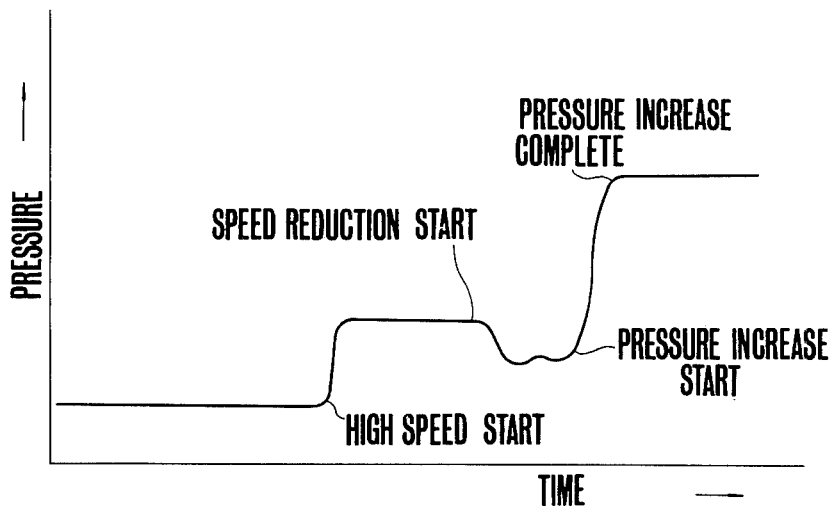

According as filling up operation to the mold is completed, the pressure Pa to the head side of the cylinder 301 is elevated up to its maximum to make the molten material extend to the dead head portion, and is maintained as elevated until the cooling process for the product cast is over. FIGS. 18 and 19 are graphical representation showing the programmed pressure variation of the piston in such a process from the beginning of its low speed advance to the completion of molding that has been explained above.

Meanwhile, the ram 303 is made to go back in the following manner.

At first, the solenoid 312b for regression of four directional selector valve 312 is energized to communicate the port P with the port A as well as the port T with the port B. By this operation, the working oil from the pump 313 flows through the pipe 315, the check valve 322, the throttles 321 and 320, and at last reaches the rod side of the cylinder 301 through the pipe 319, thereby the ram 303 being made to move back. At this time, the working oil entering the rod side of the cylinder 304 through the check valve 343, the throttle 342 and the pipe 316 acts on the piston 305 to push back thereof. However, the piston 305 is kept stood still by the check valve 311 closed at that time. The moving back speed of the ram 303 is arbitrarily selected by adjusting the throttle 321.

When the ram 303 moves back to open the check valve 311 by pushing it back with the metal member 347 which is mounted at the rear end of the cylinder 301, the piston 302 stops moving back further. As a result of this, the piston 305 is made to go back with the working oil which has entered into the rod side of the cylinder 304. The moving back speed of the piston 305 in the case is controlled by adjusting the throttle 342. When the metal member 307 for regulating the stroke which is mounted on the tip portion of the rod 306 is block by the tip portion of the cylinder 304, the piston 305 stops moving back any more.

In the event that the metal mold has been changed one to the other, it is generally necessary to regulate the stroke of the piston rod 306 in the high speed operated cylinder 304 in response to the volume of the mold cavity. This is done by adjusting said metal member 307 for adjusting the stroke. The stroke adjustment of the piston 302 is made by adjusting the position of the metal member 347.

Figure 20:
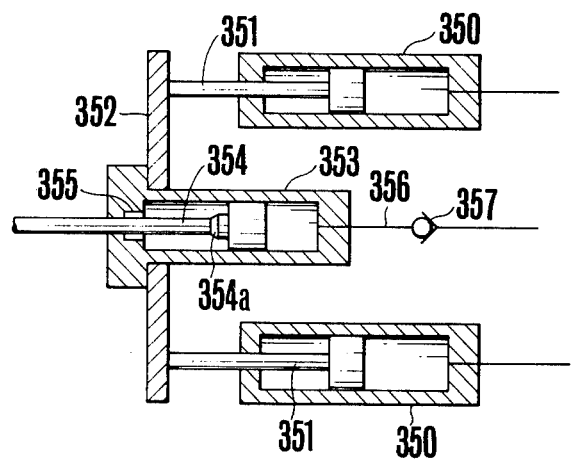

FIG. 20 shows still another injection apparatus embodying the present invention. In this embodiment, there are provided two low speed operated cylinders 350 which are located in parallel relation with each other. A cylinder rod 351 of said cylinder 350 has a supporting plate 352 fixed at the tip portion thereof. A cylinder 353 for exclusive use in the high speed operation is mounted at the center of said supporting plate 352. Said high speed operated cylinder has a small space 355 at its tip portion. This space 355 has cushioning effect as well as the embodiment previously discussed. A pipe 356 for supplying the working oil to the head side of the cylinder 353 has a check valve 357 intervening therein. As discribed above, the high speed operated cylinder and the low speed operated one are constructed separately in the embodiment above. However, it would be readily understood that the injection means constructed as above has same effect as that shown in FIG. 17. In the FIG. 20, a reference numeral 354a designates a tapered portion which is provided at the base portion of the piston rod 354. This tapered portion is adapted to enhance said cushioning effect. It should be noted that providing a relief value and a throttle in the rod side of the high speed operated cylinder is effective for obtaining a cushioning action as given by said small space 355.

Figure 21:
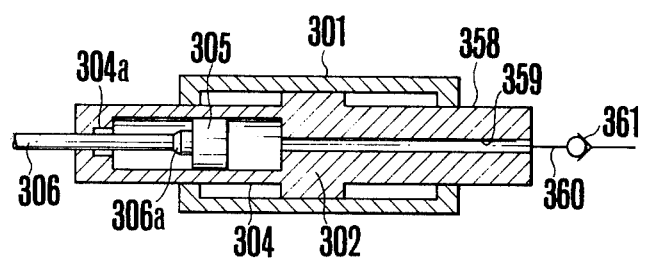

FIG. 21 shows still another injection apparatus embodying the invention. In the figure, same parts and portions as those shown in FIG. 17 bear like reference numerals, and the explanation thereon will be refrained from. In this embodiment, the piston 302 has a piston rod 358 at the rear end thereof. This piston rod 358 is made to project from the rear side of the cylinder 301 and is provided with a passage 359 formed therein. The head side of said high speed operated cylinder 304 communicates with said passage 359. Further, a check valve 361 is provided on the path of a pipe 360 for supplying working oil to said passage 359. By this construction above, it is readily understood that the same effect as obtained by the embodiment shown in FIG. 17 is obtainable also. It should be noted that a relief valve and a throttle may be provided at the rod side of the high speed operated cylinder instead of providing said small space 304a. By this construction, the piston is also made to slow down its speed when it approaches to the limit of advance. It should be also noted that the oil hydraulic circuit used in the embodiments shown in FIGS. 20 and 21 may be constructed as that shown in FIG. 17. Further, oil hydraulic sources may be separately constructed, one for the high speed operated cylinder and the other for low speed operated cylinder which supply pressures different from each other.

As explained above, the injection apparatus embodying the present invention comprises a low speed operated cylinder which further comprises a high speed operated cylinder built in its ram. When said ram has been advanced to a setpoint, the high speed operated cylinder is made to operate to perform high speed injection. Further, the injection means of this invention comprises the small space 304a which is formed at the tip portion of the cylinder 304, and said space is made to present a cushioning effect during molding performance. Therefore, the speed reduction of the piston rod can be finished within a very short period immediately before the completion of filling up the mold with the molten material to the full without generating any peak pressure and pressure vibration, and immediately after the completion of filling up operation above the prescribed pressure is additionally applied to the molten material, thereby the undesirable cavity in the product cast or molded being eliminated.

Figure 22:
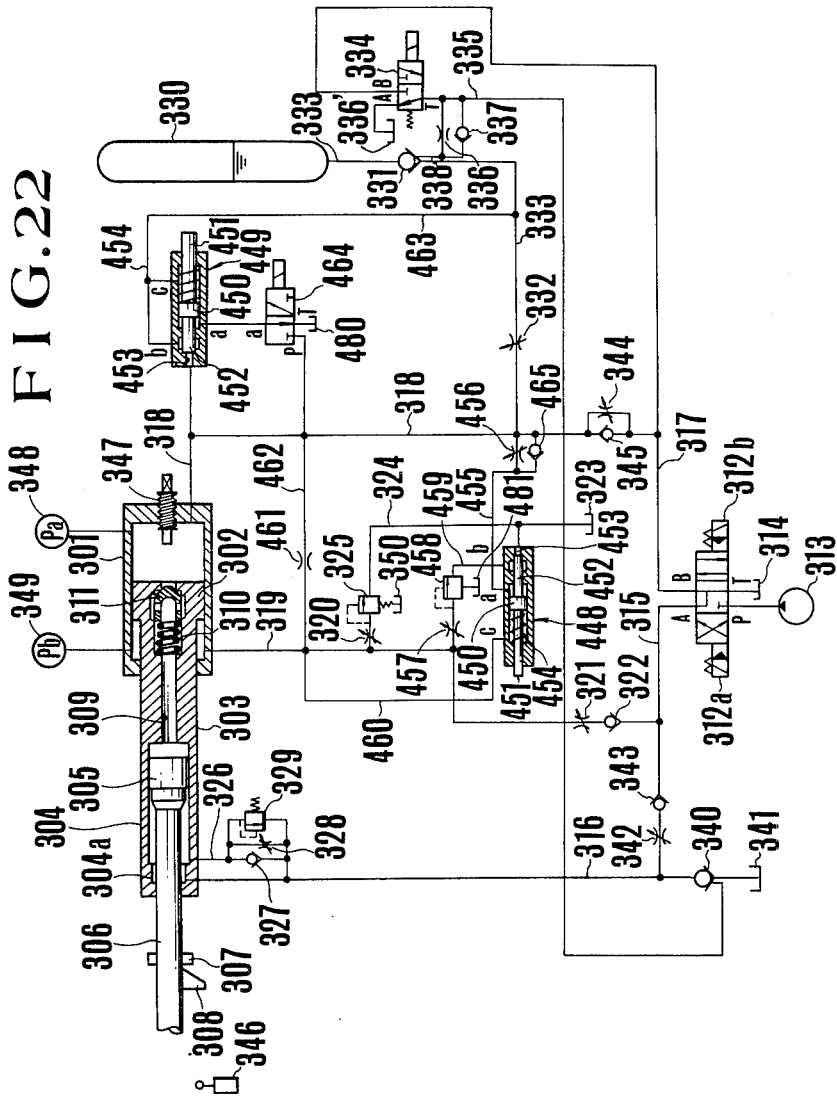
FIG. 22 is a schematic diagrammatical representation showing still another embodiment of the invention.

FIG. 22 shows still another embodiment of this invention which is constructed by combining special valve with the embodiment comprising the cylinders 301 and 304 as shown in FIG. 17. By this combination, the pressure for pressing the filled molten material additionally can be raised up step by step basis. In this figure, the same parts and portion as those shown in FIG. 17 are numbered with identical reference numerals.

Now, referring to the figure, reference numerals 448 and 449 are control valves used in the process of elevating up said pressure applied additionally. Both of valves have an entirely identical construction, and comprise a slidable piston 450, piston rods 451 and 452 which are provided at both end of said piston 450. The tip of the piston rod 452 is always given a force with a spring 454 to close a passage 453 for releasing the working oil. The a-port of said control valve 448 is connected by means of a pipe 455 to said pipe 318 through a throttle 456 and a check valve 465, while the b-port of the same is connected by means of a pipe 459 to said pipe 319 through a throttle 457 and a relief valve 458 which is set lower than said relief valve 325. Further, the c-port of said valve 448 is connected by means of a pipe 460 to said pipe 319 which is further connected to the pipe 318 by means of a pipe 462 having a throttle 461. On the other hand, the b- and c-ports of the valve 449 are connected to a pipe 333 led from an accumulator 330 through a pipe 463. The a-port of the valve 449 is connected to the a-port of said three directional selector valve 464 which is changed over upon receipt of a signal from said limit switch 346.

Now, let us explain the operation of the injection means constructed as above.

The solenoid 312a of the four directional selector valve 312 is energized to communicate the P- and B-ports with each other, thereby the working oil from the pump 313 is led to the head side of the cylinder 301 through the pipe 317, the throttle 344, and the pipe 318. At this time, the pilot check valve 340, and the check valve 311 are closed, so that the working oil in the rod side of the cylinder 304 cannot be flown out, thus the ram 303 progressing along with the piston 305. In this progression, the working oil in the rod side of the cylinder 301 is returned to the tank 323 through the pipe 319, throttle 320, relief valve 325 and pipe 324. The speed in this low speed progression can be selected arbitrarily by means of adjusting the throttle 344. In the low speed progression the pressure $P_b$ in the rod side of the cylinder 301 follows the equation (1) explained in the foregoing description, while the head side pressure $P_a$ of the same follows the equation (2) set forth above.

When the piston rod 306 is advanced at a low speed, and at last the striker 308 provided at the tip portion of said rod 306 has struck the limit switch 346, the three directional selector valves 334 and 364 are energized to make the T- and B-ports thereof communicate with each other. By this operation, the working oil from the pipe 317 flows through the throttle 336 and is led through the pipe 338 to the pilot check valve 331 to open thereof, while working oil from the accumulator 330 is led to the head side of the cylinder 301 through the pipe 333, pilot check valve 331, throttle 332 and pipe 318. At the same time the working oil from the pump 313 is led to the pilot check valve 340 through the pipe 335 to give a pilot pressure to it, thereby said valve 340 being opened. By this, the working oil in the rod side of the cylinder 304 is released to the tank 341, thus the check valve 11 being made to open. Therefore, the working oil entering into the head side of the cylinder 301 from the accumulator 330 is made to act on the head side of the piston 305 through the passage 309 to cause the high speed progression of the piston rod 306. The speed of this progression is selected arbitrarily by means of adjusting the throttle 332. In this high speed progression the head side pressure of the cylinder 301 is balanced corresponding to increase of the running resistance of high speed operated cylinder 303. The pressures $P_b$, $P_a$ in this time follow the equation (3) and (4). Further, the ratio of the cross sectional area of the cylinder 301 to the same of the cylinder 304 and the setpoint of the relief valve 325 are selected to make the relation $P_b < P_R$ hold for, so that the ram 303 is not advanced in the high speed operation, thus it being kept stood still.

Meanwhile, as will be described later, the control valve 449 is not opened during the high speed operation because a differential pressure is generated before and behind the throttle 332 during the operation.

When the high speed operated piston rod 306 approaches to its advance limit, thereby the tip of the rod 305 being made to enter into space 304a of the cylinder 304, the rod 306 begins to slow down its speed since it receives cushioning action provided by said space 304a. The characteristics of said cushioning action can be adjusted with the relief valve 329 and the throttle 328.

Further, when the tip portion of the piston 305 has entered said space 304a and the speed of the rod 306 has been reduced, the differential pressure before and behind the throttle 332 is made smaller. Consequently, the piston 450 of the control valve 449 is moved back and the working oil from the accumulator 330 is flown at an adequate velocity, thereby the head side pressure of the cylinder 301 being increased within a very short period regardless of the degree of opening of the throttle 332.

When the cushioning action comes into effect, the rod side pressure of the cylinder 304 is increased and at the same time, the head side pressure $P_a$ of the cylinder 301 communicating with the passage 309 is increased. Corresponding to this, the rod side pressure $P_b$ of the cylinder 301 is increased also. When the pressure $P_b$ is elevated up to the setpoint of the relief valve 325, the piston 302 begins automatically to progress again. In this progression, the pistons 302 and 305 are travelling together without making any relative motion therebetween. The travelling of the pistons above is continued until filling up the mold with the molten material to the full is completed.

In the re-progression above, the head side pressure $Pa$ of the cylinder 301 and the rod side pressure $Pb$ of the same hold the relation $Pa < Pb$ as mentioned before. At this time the controlled valve 448 is closed. According as filling up the mold operation is over, the relation between $Pa$ and $Pb$ becomes $Pa = Pb$, thereby the control valve 448 beginning to change over and the flow Q of the working oil which is determined by the throttle 456 being made to flow into the a-port of the control valve 448.

Figure 23:
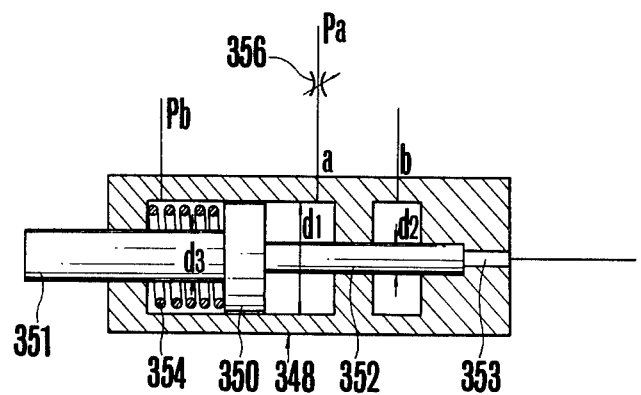
FIG. 23 is a cross sectional view of a control valve used in the embodiment shown in FIG. 22.

Now, referring to FIG. 23, a reference mark $d_1$ designates the diameter of the piston 450, $d_2$ the same of the piston 452, $d_3$ the diameter of the rod 451, $F_s$ the resilient force of the spring 454 and S the stroke of the rod 452. As mentioned above, the relation $Pa < Pb$ is always held from the beginning of the low speed progression to the end of filling up the mold with the molten material to the full. At this time, respective parts of said control valve 448 are designed to make the valve 448 close. In other words, under the condition $Pa < Pb$, the respective valve of $d_1$, $d_2$, $d_3$, and $F_s$ is selected to realize the following inequality, $$Pa \times \frac{\pi}{4}(d_1^2 - d_2^2) < Pb \times \frac{\pi}{4}(d_1^2 - d_3^2) + F_s$$

Upon the completion of filling up of the molten material, the pressures $Pa$ and $Pb$ reaches the condition $Pa = Pb$. At this time, the inequality as mentioned above becomes $$Pa \times \frac{\pi}{4}(d_1^2 - d_2^2) > Pb \times \frac{\pi}{4}(d_1^2 - d_3^2) + F_s$$

thereby the piston 450 begins to move. The time $t$ required for changing the control valve 448 is defined by the following equation.

$$t = \frac{\frac{\pi}{4}(d_1^2 - d_2^2)S}{Q}$$

where $Q$ represents the flow from the a-port of the valve. From the equation above, it is readily understood that the time can be selectively set by adjusting the throttle 456. When the changeover above is completed, the b-port and the passage 453 is made to communicate with each other. As explained above, the changeover of the control valve is carried out by utilizing the pressure change of the working oil which takes place according to the completion of filling up of the molten material, thus a sure changeover operation being obtained.

According as the changeover of the control valve is finished, the rod side pressure $Pb$ of the cylinder 301 tends to go down to the setpoint of the relief valve 458. The decreasing speed of the pressure is controlled by means of adjusting the throttle 457. The throttle valve 461 located on the path of the pipe 462 is adapted to maintain the pressure of the relief valve 458.

Figure 24:
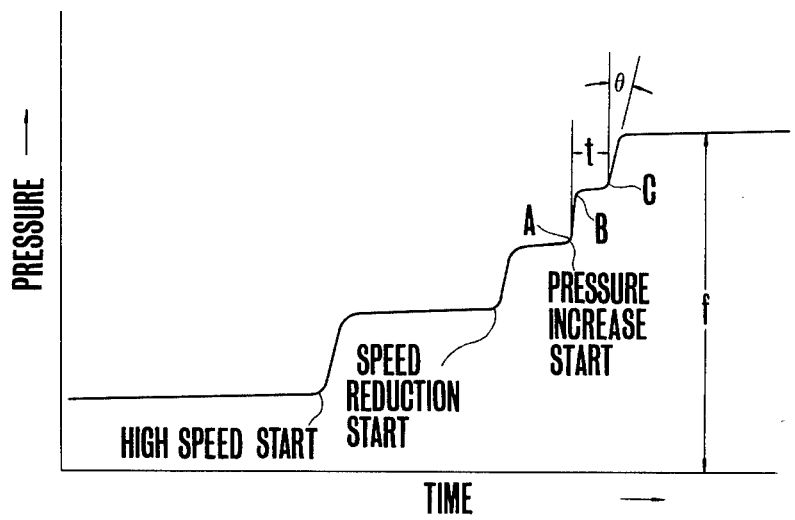
FIG. 24 is a graphical representation to show piston pressure vs time characteristics of the apparatus shown in FIG. 23.

Let us explain the operation described above referring to FIG. 24 which is a graphical representation for describing the output of the cylinder in terms of the pressure thereof. At the point A marked on the graph, the filling operation of the molten material is finished, and the working oil from the accumulator enters into the head side of the cylinder 301 through the pipe 318 to perform the additional press on the molten material, thereby the pressure being elevated to the level marked B. At the point B, the control valve 448 is changed under the regulation by means of the throttle 456 spending the time $t$. The pressure during this operation is kept unchanged at the identical level. Thereafter, the pressure is further elevated to another level $f$ which is determined by the setpoint of the relief valve 458. The increase ratio, i.e. the gradient $\theta$ of pressure increase at this time is determined by the throttle 457. As explained above, the increase of the pressure for pressing additionally the molten material to ensure the molding is made not at once but along the program is stepped fashion according to the present invention. By using the process above, undesirable casting fins are effectively eliminated. At this time, the pressures $Pa$ and $Pb$ before and behind the cylinder 301 follows the equations (5) and (6) explained before.

According as the filling up of the molten material is completed, the head side pressure $Pa$ of the cylinder 301 is elevated up to the maximum value thereof to give the additional and finishing force upon the molten material in the mold cavity. This force is kept as given until the molten material is solidified. Then the ram is made to move back. This returning motion of the ram follows the steps under-mentioned.

The solenoid 312b of the four directional selector valve 312 is energized to make the ports P and A communicate with each other as well as the ports T and B. Subsequent to this operation, the working oil from the pump 313 flows into the rod side of the cylinder 301 through the pipe 315, check valve 322, throttle 321 and pipe 319. At this time, the working oil flowing through the check valve 343 and throttle 342 tends to enter into the rod side of the cylinder 304 through the pipe 316 to push the piston 305 back. However, since the check valve 311 is closed, the piston 305 is kept stood still. The moving back speed of the ram can be set arbitrarily by means of adjusting the throttle 321. At the same time, the three directional selector valves 334 and 364 are changed to return to the state as shown in FIG. 23, thereby the working oil supply from the accumulator 330 being cut off. By this, the check valves 448 and 449 are also returned to the state as shown.

The ram is moved further back until the tip of the metal member 347 provided at the rear end of the cylinder 301 pushes the check valve 311 of the piston 302 to open thereof. When the valve 311 above has been opened, the piston 302 stops moving back any more. As a result of this, the working oil flowing into the rod side of the cylinder 304 makes the piston 305 start to move back. The moving back speed of the piston 305 is set by adjusting the throttle 342. The moving back motion of the piston 305 is ceased when the metal member 307 for adjusting the stroke comes to hit the cylinder 304 on the tip thereof.

As explained above, the above injection apparatus embodying the present invention comprises the relief valve 458 for controlling the back pressure of the cylinder 301, the control valve 448 for changing the back pressure, the throttle 456 for controlling the time required for said changing, and the control valve 449 for performing the pressure increase very abruptly regardless of the degree of restriction of the throttle 332. Accordingly, the output of the cylinder can be adjusted such that the force which is given additionally to the molten material in the mold cavity upon the completion of filling up thereof is increased in stepped fashion, thereby undesirable ejection of the molten material from the interface of two mold halves being prevented.

Although the invention has been shown and discussed by means of taking several embodiment as above, it should be noted that the invention is by no means limited to such embodiment and that various changes and modifications can be made out by one skilled in the art.

What is claimed is:

1. A variable speed, liquid driven injection cylinder having first and second chambers with an inlet port coupled to said first chamber and an outlet port coupled to said second chamber, said inlet and outlet ports adapted to selectively permit the flow of a liquid into and out of said chambers, said injection cylinder further having (i) a piston head and an associated piston rod slidably disposed therein such that said piston rod extends out of said cylinder adjacent said second chamber, said piston head having an opening at one end thereof in axial alignment with a cavity located in said piston rod, said piston rod having a port adjacent said piston head; and (ii) a hollow tube coupled to said cylinder and disposed through said opening in said piston head and into said cavity and said piston rod, said hollow tube having a check valve at one end thereof and at least one port adjacent the other end, said piston head configured to selectively block said ports on said hollow tube as said piston rod slides out of said cylinder, whereby after said first and second chambers are filled with liquid, as further liquid is caused to enter said first chamber through said inlet port, liquid in said second chamber is initially prevented from exiting out of said outlet port and is caused to flow along a path through said port on said piston rod, each of said ports on said hollow tube, selectively through said check valve and into said first chamber, as the amount of liquid in said first chamber increases, said piston rod is caused to move out of said cylinder and whereby as the piston rod is caused to move out of said cylinder, each of said ports on said hollow tube are selectively blocked off by said piston head such that said liquid in said second chamber is prevented from traveling to said first chamber and is caused to flow out of said outlet port.

2. An injection cylinder according to claim 1 wherein said piston head has a regulating means disposed therein for selectively blocking each said port of said hollow tube as said piston rod slides out of said cylinder.

3. An injection cylinder according to claim 2 wherein a liquid input means is coupled to said check valve for supplying said liquid to said cylinder such that upon activation of said liquid input means, said piston rod is caused to slide in said cylinder.

4. An injection cylinder according to claim 1 wherein a first throttling means is coupled to said cylinder for regulating the flow of said liquid into said first chamber.

5. An injection apparatus for use in an injection molding system comprising an injection cylinder having an inlet port and an outlet port adapted to selectively permit the flow of a liquid into and out of said cylinder, said injection cylinder further having first and second ends with a piston slidably disposed therein and extending out of said first end thereof, and a hollow tube coupled to said piston and extending out of said second end of said injection cylinder, said hollow tube having at least one port and said piston having blocking means for blocking off each said port on said hollow tube as said piston slides in said cylinder whereby as liquid is caused to flow into said injection cylinder through said inlet port, said piston is caused to slide in said cylinder said liquid being initially permitted to flow through each said port on said hollow tube and is then prevented therefrom as each said port engages said blocking means.

6. An injection apparatus according to claim 5 wherein a control cylinder is located within said injection cylinder with said hollow tube extending therein, said control cylinder for controlling the rate at which said piston slides in and out of said injection cylinder.

7. An injection apparatus according to claim 6 wherein a cavity is defined in said injection cylinder, in which cavity said piston is disposed, and further wherein a passageway is defined in said injection apparatus joining said control cylinder and said cavity with a valve disposed along said passageway.

8. An injection apparatus according to claim 5 wherein said casing has a second passage coupling said casing with said injection cylinder adjacent said second end of said injection cylinder such that as said piston slides in said cavity towards said first end of said injection cylinder, said liquid travels through said casing and back into said injection cylinder adjacent said second end thereof.

9. An injection apparatus according to claim 5 wherein said rod member in said casing has means for selectively preventing said liquid from flowing through said casing when said rod is extended a predetermined distance.

10. An injection apparatus for use in an injection molding system comprising an injection cylinder having a first end with an outlet port and a second end with an inlet port, said inlet and outlet ports adapted to selectively permit the flow of a liquid into and out of said injection cylinder, said injection cylinder further having a piston slidably disposed in a cavity formed in said injection cylinder and extending outwardly from said first end thereof, a casing coupled to said injection cylinder and having a slidable rod member disposed in a cavity formed in said casing and extending outwardly therefrom, said rod member and said piston being coupled together, said casing further having a passage joining said cavity in said casing with said cavity in said injection cylinder such that when a liquid is injected into said injection cylinder adjacent said second end thereof, said piston is caused to slide in said injection cylinder which, in turn, causes said rod member in said casing to slide in said casing.

11. An injection apparatus according to claim 10 wherein a valve member is disposed in said casing to regulate the flow of said liquid therethrough.

12. An injection cylinder for injecting a molten material into a mold comprising
   a. an elongated, hollow injection cylinder having a first and second end with a first port adjacent the first end thereof and a second port adjacent the second end thereof, said first and second ports adapted to selectively permit the flow of a liquid into and out of said injection clyinder,
   b. a piston and associated piston rod slideably disposed in said injection cylinder and extending out of first end thereof, said piston and rod forming an elongated cavity opening into said injection cylinder, said piston and rod further having at least one port adjacent the end disposed within said injection cylinder;
   c. a hollow tube coupled to said second end of said injection cylinder and slideably extending into said cavity in said piston and piston rod, said tube having at least one port adjacent the end extending into said cavity and a valve at the opposite end of said tube;

d. throttling means coupled to said injection cylinder adjacent said first and second ports for controlling the flow of said liquid into and out of said injection cylinder.

13. An injection cylinder according to claim 12 wherein said piston head has a regulating means disposed therein for selectively blocking each said port on said tube as said piston slides out of said cylinder.

14. An injection apparatus for use in an injection molding system comprising an injection cylinder having first and second cavities formed therein and having an outlet port adjacent a first end and an inlet port adjacent a second end of said injection cylinder, said injection cylinder further having a piston slideably disposed in said cavity and extending out of said first end of said injection cylinder, a hollow tube formed integrally with said piston and extending toward said second end of said injection cylinder and into said second cavity, said tube having at least one port adjacent said second end of said injection cylinder, a passage joining said second cavity in said injection cylinder with said first cavity, a check valve disposed in said passageway so as to regulate the flow of said liquid in said injection cylinder, and means disposed in said injection cylinder for selectively blocking said ports on said tube as said tube slides in a predetermined direction in said injection cylinder.

15. An injection apparatus according to claim 14 wherein said piston is disposed in a first cavity in said injection cylinder and said tube extends into a second cavity in said injection cylinder, said second cavity forming a control cylinder for controlling the rate at which said piston slides in said injection cylinder.

16. An injection cylinder according to claim 14 wherein a solenoid-operated valve is coupled to an associated pump which in turn is coupled to said check valve whereby oil is selectively regulated to check valve.

17. An injection cylinder according to claim 14 wherein an area is formed in said injection cylinder adjacent said check valve, said area communicating with the interior of said hollow tube.

18. An injection cylinder according to claim 17 wherein said inlet port in said cylinder communicates with said area adjacent said check valve.

* * * * *